US009302702B1

(12) United States Patent
Schepmann et al.

(10) Patent No.: US 9,302,702 B1
(45) Date of Patent: Apr. 5, 2016

(54) STEERING CONTROL MECHANISMS FOR AN ELECTRIC VEHICLE (71) Applicant: Proterra Inc., Greenville, SC (US)

(72) Inventors: Seneca A. Schepmann, Greenville, SC (US); Sam Shartzer, Greenville, SC (US); Michael Finnern, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/671,296

(22) Filed: Mar. 27, 2015

(51) Int. Cl.
*B62D 5/065* (2006.01)
*B62D 5/14* (2006.01)
*B62D 5/04* (2006.01)

(52) U.S. Cl.
CPC .............. *B62D 5/065* (2013.01); *B62D 5/0463* (2013.01); *B62D 5/14* (2013.01)

(58) Field of Classification Search
CPC .................................. B62D 5/065; B62D 5/064
USPC ......... 180/441, 442, 422, 421, 443, 444, 446; 701/41
See application file for complete search history.

(56) References Cited

U.S. PATENT DOCUMENTS

| 5,761,627 | A  | * | 6/1998  | Seidel et al. ................. 701/41 |
| 5,762,159 | A  | * | 6/1998  | Matsuoka et al. ............ 180/422 |
| 5,967,253 | A  | * | 10/1999 | Collier-Hallman .......... 180/421 |
| 6,089,344 | A  | * | 7/2000  | Baughn et al. ............... 180/446 |
| 6,092,012 | A  | * | 7/2000  | Shimizu ......................... 701/41 |
| 6,144,909 | A  | * | 11/2000 | Sakamaki et al. ............. 701/41 |
| 6,318,495 | B1 | * | 11/2001 | Obata ........................... 180/422 |
| 6,366,842 | B1 | * | 4/2002  | Kaji et al. ...................... 701/41 |
| 7,360,614 | B2 | * | 4/2008  | Yokote ........................ 180/6.24 |
| 8,267,219 | B2 | * | 9/2012  | Yamazaki .................... 180/444 |
| 2005/0236220 | A1 | * | 10/2005 | Soeda et al. ................. 180/442 |
| 2009/0120085 | A1 | * | 5/2009  | Yamaura ........................ 60/423 |
| 2011/0272204 | A1 | * | 11/2011 | Nell et al. .................... 180/441 |

OTHER PUBLICATIONS

TRW Automotive Inc., "Integral Power Steering Gear Maintenance Manual", 2009 (32 pages).

* cited by examiner

*Primary Examiner* — Anne Marie Boehler
(74) *Attorney, Agent, or Firm* — Bookoff McAndrews, PLLC (57) ABSTRACT

The present disclosure is directed to a steering system for an electric vehicle. The steering system may include a hydraulic pump configured to direct hydraulic fluid to a steering gearbox of the electric vehicle, and an electric motor having a shaft that is coupled to the hydraulic pump. The electric motor may be configured to drive fluid flow through the pump. The steering system may also include a sensor configured to measure a value indicative of a torque applied by the electric motor, and a control unit configured to control operation of the electric motor based on an input from the sensor.

15 Claims, 6 Drawing Sheets

STEERING CONTROL MECHANISMS FOR AN ELECTRIC VEHICLE

TECHNICAL FIELD

The current disclosure relates to steering control mechanisms for an electric vehicle. In particular, the current disclosure relates to a hydraulically assisted power steering mechanism for electric buses.

BACKGROUND

Many different vehicle systems use hydraulically assisted power steering. For most heavy-duty vehicles, it is the only feasible way to develop the torque needed to turn the vehicle wheels at low speeds. Some lighter-duty vehicles (e.g., small cars) utilize an electrically assisted power steering mechanism that uses only an electric motor directly tied into the steering path. While this is a feasible alternative for smaller vehicles, electrically assisted power steering mechanisms generate insufficient force to assist steering a heavy-duty vehicle chassis due to the significantly increased torques needed to steer the wheels.

Some hybrid vehicles utilize an electrically powered hydraulic steering system. In such electrically powered hydraulic steering systems, the electric motor can be controlled on fixed speed basis. That is, the steering assist electric motor continuously runs at the same speed while the vehicle is running, which is highly inefficient and increases wear on all components.

In some cases, difficulties also may arise when trying to add sensors to a steering system to measure driver torque applied to the steering wheel. Using steering sensors alone, for example, as in some electrically-driven power steering systems, can lead to overly complex control methods and poor driver steering feel.

The present disclosure addresses some of these aspects of the prior art and/or other aspects of the prior art.

SUMMARY

Embodiments of the present disclosure relate to, among other things, steering mechanisms for electric vehicles. Each of the embodiments disclosed herein may include one or more of the features described in connection with any of the other disclosed embodiments.

In one aspect, the present disclosure is directed to a steering system for an electric vehicle. The steering system may include a hydraulic pump configured to direct hydraulic fluid to a steering gearbox of the electric vehicle, and an electric motor having a shaft that is coupled to the hydraulic pump. The electric motor may be configured to drive fluid flow through the pump. The steering system may also include a sensor configured to measure a value indicative of a torque applied by the electric motor, and a control unit configured to control operation of the electric motor based on an input from the sensor.

In another aspect, the present disclosure is directed to a method for controlling power steering in an electric vehicle. The method may include receiving a measurement indicative of a torque applied by an electric motor of the electric vehicle, the electric motor driving a hydraulic pump supplying hydraulic steering assist pressure to a steering gearbox of the electric vehicle, and activating the electric motor to generate hydraulic steering assist pressure with the hydraulic pump when the indicated torque is greater than a first torque threshold In yet another aspect, the present disclosure is directed to an electric vehicle. The electric vehicle may include a steering wheel, and a pair of wheels coupled to one another by one or more steering linkages. The electric vehicle may also include a steering gearbox coupled to the steering wheel and to the pair of wheels. The steering gearbox may be configured to turn the pair of wheels in response to a torque applied to the steering wheel. The electric vehicle also may include a hydraulic pump configured to direct hydraulic fluid to the steering gearbox to assist turning of the pair of wheels, and an electric motor having a shaft that is coupled to the hydraulic pump. The electric motor may be configured to drive fluid flow through the hydraulic pump. The electric vehicle may also include a current sensor configured to measure a current directed to the electric motor. The measured current may be indicative of a torque applied by the electric motor. The electric vehicle may also include a control unit configured to increase a speed of the electric motor when the torque indicated by the current sensor is greater than a first torque threshold.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes steering mechanisms for electric vehicles (e.g., electric buses). More specifically, the present disclosure relates to methods for controlling the speed of a power steering electric motor in an electrically-driven, hydraulically assisted power steering system. The methods of the present disclosure may minimize energy consumption (e.g., electrical energy consumption) while still providing power steering assistance when needed. While principles of the current disclosure are described with reference to an electric bus, it should be understood that the disclosure is not limited thereto. Rather, the systems and methods of the present disclosure may be used in association with any electric vehicle (cars, two-wheelers, trains, and hybrid vehicles that are powered by both a battery and a combustion-engine).

Figure 1:
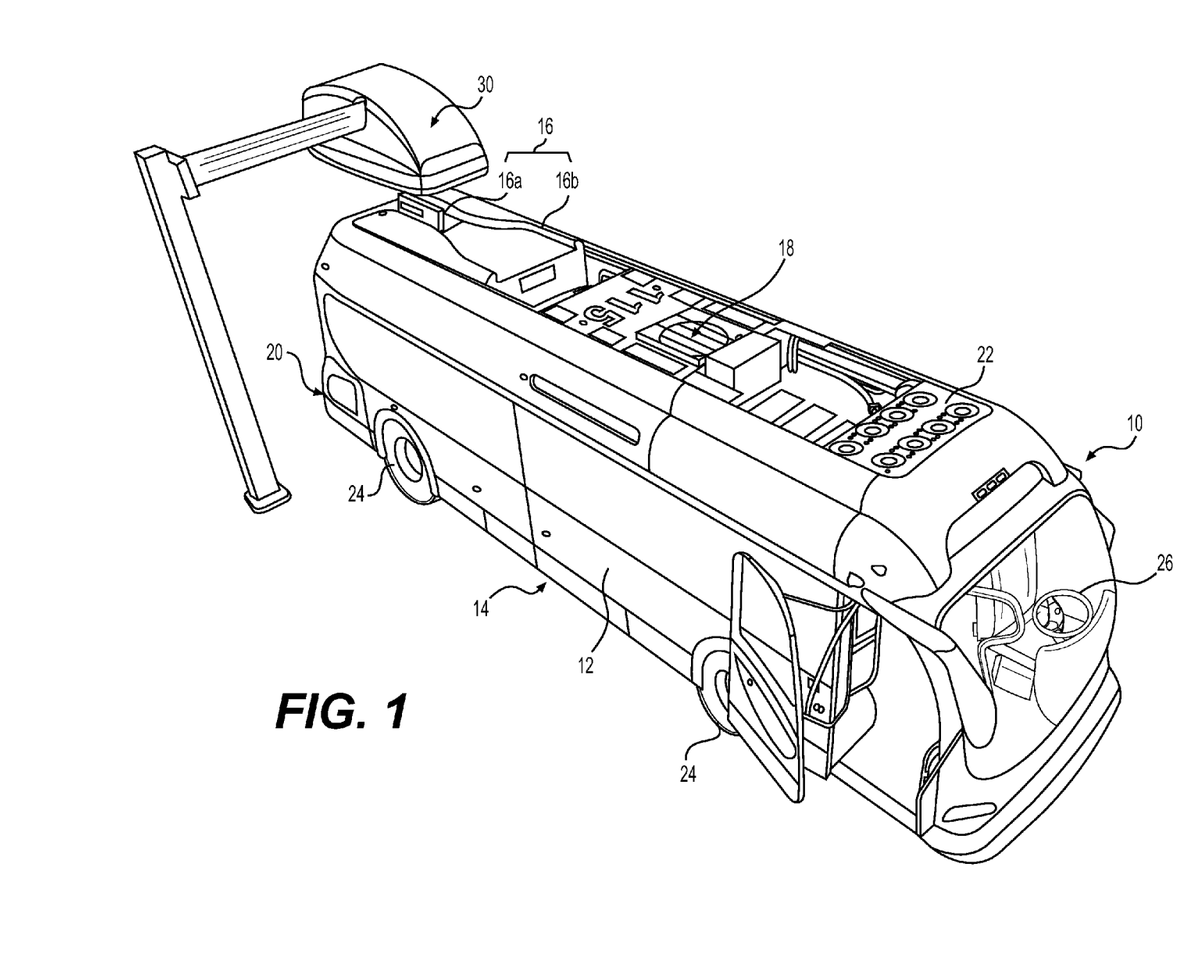
FIG. 1 is an illustration of an exemplary electric bus according to the present disclosure.

FIG. 1 illustrates an electric vehicle in the form of a bus 10. Electric bus 10 may include a body 12 enclosing a space for passengers. In some embodiments, bus 10 may be a low-floor electric bus. As is known in the art, in a low-floor bus there are no stairs at the front and/or the back doors of the bus. Bus 10 may include batteries 14 that store electrical energy to power the bus 10. These batteries 14 may be positioned at any location in the bus 10. In some embodiments, the batteries 14 may be positioned in cavities located under the floor of the bus 10, and may be accessible from below the bus 10. In some embodiments, the batteries 14 may be lithium titanate batteries configured for fast charging. However, in general, batteries 14 may include any chemistry (for example, lead-acid, nickel cadmium, nickel metal hydride, lithium ion, zinc air, etc.). Bus 10 may also include components such as an HVAC system 18 to cool the passenger compartment, and a radiator 22 to cool the heat producing components of bus 10.

A charging interface 16 may be provided on the roof of the bus 10 to charge the batteries 14. The charging interface 16 may include components that interface with an external charging station 30 to charge the batteries 14. These components may include a charging blade 16a and an alignment scoop 16b. The alignment scoop 16b may align and direct a charging brace (not shown) of the external charging station 30 towards the charging blade 16a to electrically connect them and charge the batteries 14.

Figure 2:
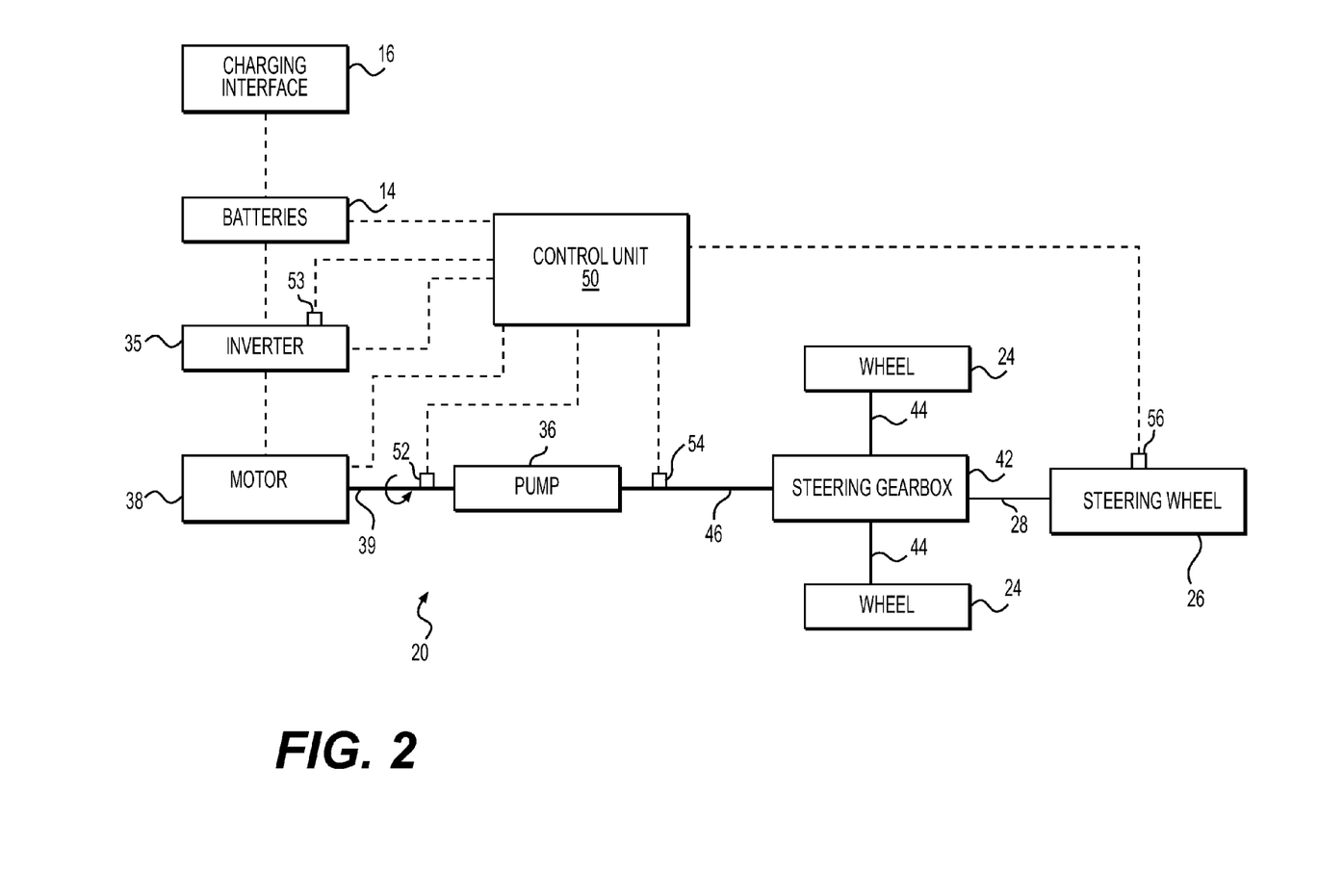
FIG. 2 is a schematic illustration of several exemplary systems of the electric bus of FIG. 1.

Referring to FIGS. 1 and 2, bus 10 may include several components and systems that assist in its functioning. For example, bus 10 may include a steering system 20 that is configured to turn wheels 24 of bus 10 in response to a driver's movement of steering wheel 26. Steering wheel 26 may be configured to turn a front pair of wheels 24 and/or a rear pair of wheels 24. Steering wheel 26 may be coupled to a steering column 28 and a steering gearbox 42. Steering gearbox 42 may be any suitable steering gear system, such as, e.g., a rack-and-pinion gear system, a recirculating-ball gear system, or the like. Steering gearbox 42 may be configured to convert the rotational motion applied to the steering wheel 26 and steering column 28 into a linear motion to turn wheels 24 (via, e.g., steering linkages 44).

Steering gearbox 42 may be coupled to a pump 36 (e.g., a hydraulic pump) via one or more fluid lines, valves, and other connections. Pump 36 may be a rotary-vane pump or another suitable pump configured to deliver pressurized hydraulic fluid to steering gearbox 42 to assist steering of bus 10. The pump 36 may be coupled to an electric motor 38 via a shaft 39. The electric motor 38 may be a permanent magnet synchronous motor (AC motor), 3-phase AC motor, permanent magnet DC motor, brushed DC motor, or any other suitable motor that operates using power from the batteries 14. In some embodiments, high voltage DC power from the batteries 14 may be converted into 3-phase AC power using an inverter 35 and directed to the electric motor 38. Electric motor 38 may convert electric power into a mechanical force that rotates shaft 39, driving fluid flow through pump 36. Therefore, fluid flow through pump 36 may increase when the rotation speed of motor 38 (shaft 39) increases, and may decrease when the rotation speed of motor 38 (shaft 39) decreases. Electric motor 38 may be controlled in any suitable manner as is known in the art. In one example, electric motor 38 may be a speed controlled motor. In a speed controlled mode, electric motor 38 may receive a desired operational speed, and may apply whatever torque is needed to maintain the desired operational speed. In another example, electric motor 38 may be a torque controlled motor. In a torque controlled mode, electric motor 38 may receive a desired torque value, and may set the motor speed as necessary to meet the torque level.

Pump 36 may be coupled to steering gearbox 42 by a hydraulic system 46. Hydraulic system 46 may include one or more hydraulic fluid lines, reservoirs, valves, and other components necessary to allow electric motor 38 and pump 36 to help steer wheels 24 via the application of generated hydraulic pressure. In one embodiment, electric motor 38 may be an electric motor distinct from another electric motor (also powered by batteries 14) that powers a powertrain of bus 10. However, it is also contemplated that electric motor 38 may power both the hydraulic steering assist and powertrain functions of bus 10. The hydraulic steering assistance provided to steering gearbox 42 by pump 36 and hydraulic system may be conventional mechanisms as is known in the art.

A control unit 50 may control various operations of the bus 10. As is known in the art, control unit 50 may include a collection of several mechanical, electrical, and integrated circuit devices (for example, computational units, ND converters, memory, switches, actuators, fuses, etc.) that function collectively to control the operation of the bus 10. The control unit 50 may control the operation of the bus 10 based on several inputs from the bus 10.

These inputs may include signals indicative of operational parameters of the bus 10. The signals indicative of operational parameters may include, among other, a torque applied by motor 38 or shaft 39, a current consumed by motor 38, a torque applied directly to steering wheel 26 and/or steering column 28 by a driver, a pressure or pressure differential sensed in hydraulic system 46, a state of charge of the batteries 14, a speed of the bus 10 and/or motor 38, and various other sensor readings that indicate a need for power steering assistance. Various sensors may measure some or all of these parameters and direct them as inputs to the control unit 50.

A torque sensor 52 may be configured to measure a torque applied by electric motor 38 to pump 36. Torque sensor 52 may be a strain gauge or another suitable torque sensing member. The torque applied by electric motor 38 may result from the application of torque to steering wheel 26. That is, when a driver applies a torque to steering wheel 26, for example, to turn bus 10, one or more valves (not shown) in steering gearbox 42 may open, causing hydraulic fluid to flow through the hydraulic system 46 that couples pump 36 to steering gearbox 42. The flow of fluid through the hydraulic system 46 may create a demand for additional fluid flow that is sensed as a torque by electric motor 38. Torque sensor 52 may sense this torque applied by electric motor 38 and send a signal indicative of the sensed torque to control unit 50.

In some examples, a current sensor 53 may be configured to measure a current applied to drive electric motor 38. Current sensor 53 may be disposed within inverter 35 or in another location suitable to measure a current applied to electric motor 38. The sensed current at inverter 35 being directed to electric motor 38 may be indicative of the torque applied by electric motor 38 to pump 36. Current sensor 53 may send a signal indicative of the current applied by electric motor 38 to control unit 50.

A pressure sensor 54 (e.g., a pressure transducer) may be configured to sense a pressure in one or more of the hydraulic fluid lines of the hydraulic system 46. The pressure sensed by pressure sensor 54 may be indicative of a torque applied to steering wheel 26 by a driver. That is, the flow of fluid through the hydraulic system 46 in response to a steering command from the driver may create a demand for additional fluid flow that is sensed as an increase in hydraulic pressure by pressure sensor 54. Additionally, a torque sensor 56 may be configured to directly measure a torque applied to steering wheel 26 by a driver. In some examples, steering torque measured by torque sensor 56 may measure a torque that is provided by both the driver and by the hydraulic assist. Pressure sensor 54 and torque sensor 56 may each be configured to send signals to control unit 50.

Control unit 50 may allow for electric motor 38 and pump 36 to operate at variable speeds based on a sensed demand for power-steering assistance. In some embodiments, electric motor 38 and pump 36 may only operate based on demand determined by control unit 50 based on feedback from one or more of torque sensor 52, current sensor 53, pressure sensor 54, and torque sensor 56.

Figure 3:
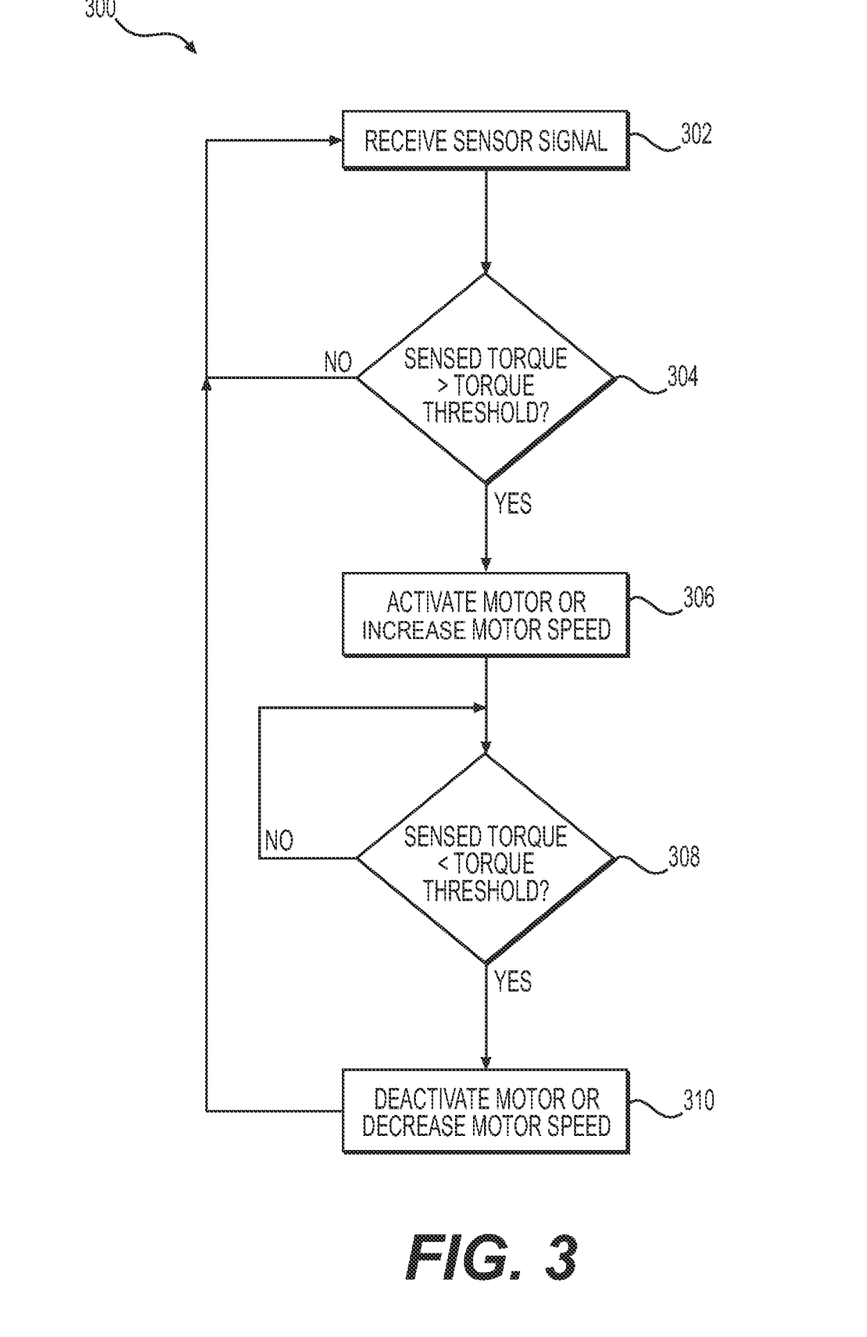
FIG. 3 is a flow chart illustrating a method according to an exemplary embodiment of the present disclosure.

FIG. 3 depicts a flowchart of an exemplary control method executed by control unit 50. A method 300 may start at step 302, where bus 10 may be in a driving mode. While bus 10 is in a driving mode, control unit 50 may continuously receive sensor signals from one or more of torque sensor 52, current sensor 53, pressure sensor 54, and torque sensor 56 indicative of the torque applied by electric motor 38. The sensed torque may include a direct torque measurement (e.g., from one or more of torque sensor 52 and torque sensor 56), and/or may include a measurement indicative of a torque applied to or applied by electric motor 38 (e.g., from one or more of current sensor 53 and pressure sensor 54). In some examples the sensed torque may be a value derived from signals received from one or more of torque sensor 52, current sensor 53, pressure sensor 54, and torque sensor 56. Method 300 may then proceed to step 304, where control unit 50 may compare the sensed torque to a torque threshold. The torque threshold may be any suitable threshold indicating that hydraulic assistance may be desired or required to steer bus 10, e.g., when a driver is turning bus 10 at low speeds. The torque threshold may be a percentage, e.g., ten percent of a maximum torque (or current) of electric motor 38. The torque threshold may correspond to a particular steering maneuver, such as, e.g., the torque required to perform a slow turn (left or right) around a 90 degree corner, where steering assist may typically be desired. The torque threshold may also be adjusted based on a speed that bus 10 is travelling. If the sensed torque at electric motor 38 is below the torque threshold, the method may return to step 302. However, if the sensed torque at electric motor 38 is greater than the torque threshold, the method may proceed to step 306.

At step 306, control unit 50 may send a signal to activate electric motor 38 or transition electric motor 38 from a standby mode to a hydraulic assist mode. Thus, control unit 50 may increase the speed of electric motor 38 (e.g., from a lower speed during the standby mode to a higher speed in the hydraulic assist mode). When operating, electric motor 38 may cause pump 36 to cycle hydraulic fluid through the hydraulic system 46, generating a hydraulic pressure that can be used by steering gearbox 42 to help turn wheels 24. During the hydraulic assist mode, control unit 50 may maintain the operating speed of electric motor 38 at a constant level to meet any anticipated level of hydraulic pressure needed to help turn wheels 24. In an alternative embodiment, control unit 50 may maintain the rotation speed of electric motor 38 (and thus the speed of fluid through pump 36) based on the level of torque sensed by torque sensor 52. That is, as the level of torque sensed by sensor 52 increases above a minimum torque activation threshold, control unit 50 may increase the speed of electric motor 38. As the level of torque sensed by torque sensor 52 decreases, control unit 50 may decrease the speed of electric motor 38.

Once electric motor 38 is activated or transitioned to the hydraulic assist mode, method 300 may proceed to step 308. At step 308, control unit 50 may compare the torque sensed by torque sensor 52 to the torque threshold. If the sensed torque remains above the torque threshold, control unit 50 may determine that power steering assistance is still needed to turn bus 10, and may maintain electric motor 38 in the hydraulic assist mode. If the sensed torque falls below the torque threshold, control unit 50 may determine that power steering assistance is no longer required, and may power down or throttle down electric motor 38 to the standby or "OFF" state, decreasing the speed of electric motor 38 at step 310. In some embodiments, while electric motor 38 is in the hydraulic assist mode, control unit 50 may require that the sensed torque remain below the torque threshold for a threshold amount of time before powering down or reducing the speed of the electric motor 38 to ensure that power steering is no longer required to turn bus 10. Any suitable threshold amount of time may be utilized, such as, e.g., 0.1 seconds to 10 seconds or more, to balance the desire to maintain power steering assistance with the energy savings realized by powering down or throttling down electric motor 38. After step 310, the method may return to step 302, forming a closed feedback loop.

In some embodiments, it is contemplated that the sensed torque may need to remain above the torque threshold for a minimum threshold amount of time before the method proceeds to step 306 to transition electric motor 38 into the hydraulic assist mode. The threshold amount of time may be any suitable period of time to prevent wasteful activation of electric motor 38, or wasteful transition of electric motor 38 to the hydraulic assist mode, when, e.g., a driver of bus 10 accidentally or temporarily applies a torque to the steering wheel 26 not intended to turn bus 10, e.g., for a simple lane control or slight steering maneuver of bus 10.

Figure 4:
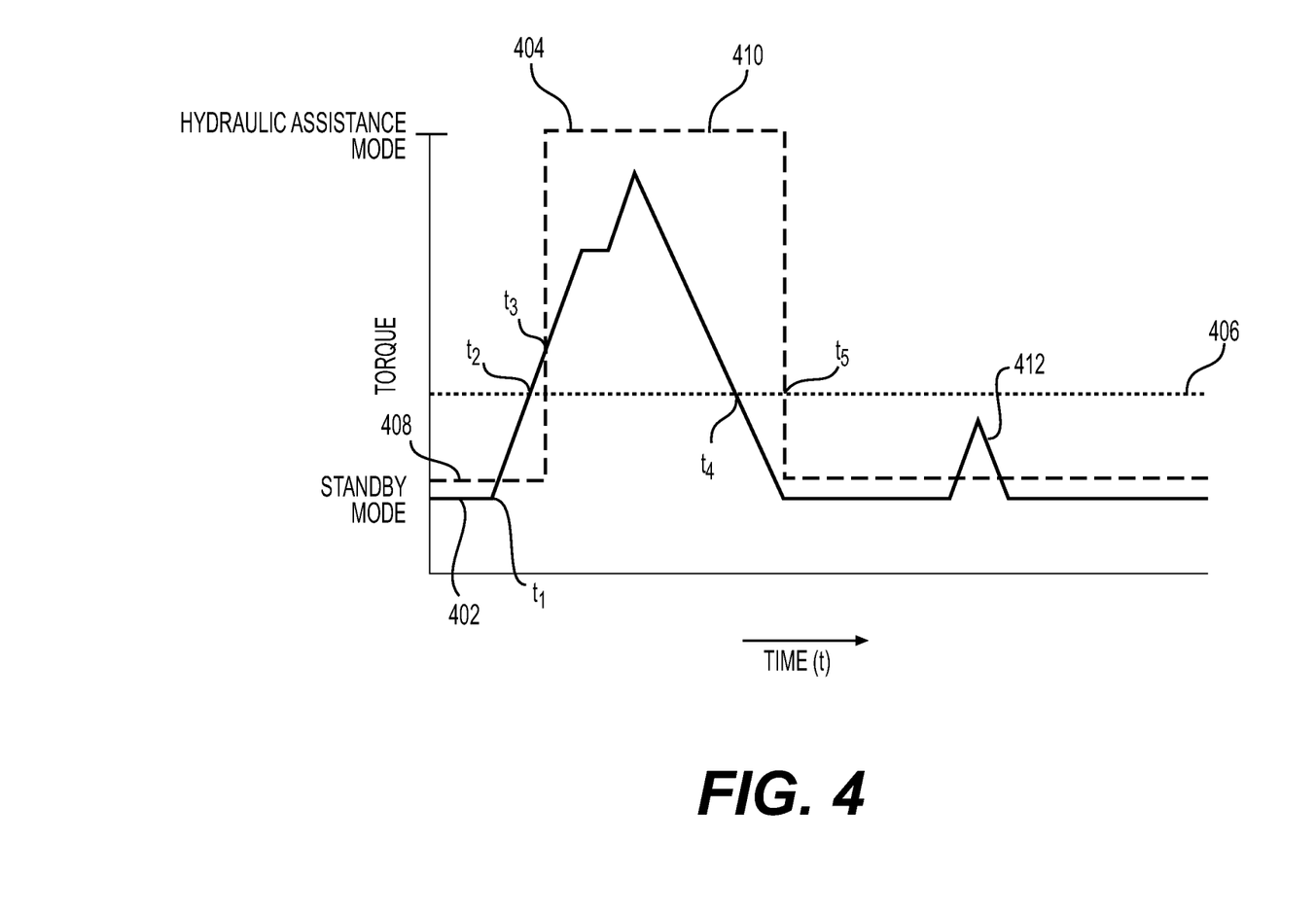
FIG. 4 is a graphical illustration of an implementation of the method of FIG. 3.

FIG. 4 is a graphical illustration of an implementation of method 300 over time t. The torque measured by sensor 52 is shown as a torque curve 402, and the operating condition of motor 308 is shown as a condition curve 404. A constant torque threshold 406 may represent a torque threshold used by control unit 50 to control the speed of electric motor 38. At time $t_1$, the driver of bus 10 may apply a torque to steering wheel 26 which, via hydraulic system 46, may cause a torque to be applied by electric motor 38 that is sensed by torque sensor 52. The sensed torque may increase from time $t_1$ to time $t_2$, at which point the sensed torque may exceed torque threshold 406. Once control unit 50 senses that the torque measured by torque sensor 52 exceeds torque threshold 406, control unit 50 may increase the speed of electric motor 38 at time $t_3$, causing electric motor 38 to move from a first condition 408 (e.g., standby mode) to a second condition 410 (e.g., hydraulic assist mode). Electric motor 38 may be activated (or its speed may be increased) instantaneously or near-instantaneously such that the difference between time $t_2$ and time $t_3$ may be negligible. For example, the difference between time $t_2$ and time $t_3$ may be attributed only to any delays in signal processing experienced by control unit 50 or its associated sensors. In other examples, the difference between time $t_2$ and time $t_3$ may represent a purposeful delay programmed into control unit 50.

Control unit 50 may maintain electric motor 38 at the second condition 410 to continue to cycle hydraulic fluid through pump 36 and hydraulic system 46 at least until the sensed torque falls below torque threshold 406 at time $t_4$. Once control unit 50 determines that the sensed torque has fallen below torque threshold 406, control unit 50 may power down or reduce the speed of electric motor 38 at time $t_5$. The difference between time $t_4$ and $t_5$ may be a delay programmed into control unit 50 to help ensure that no additional hydraulic assistance is needed to turn bus 10. Control unit 50 may also instantaneously power down (or decrease the speed of) electric motor 38 as soon as the sensed torque falls below torque threshold 406.

Minor applications of torque sensed by torque sensor 52 may not result in the activation or transition of electric motor 38 into the hydraulic assist mode. For example, a torque event 412 may represent a slight adjustment of steering wheel 26 by a driver, e.g., when changing lanes at high speed, which may not require any hydraulic assistance to turn wheels 24 of bus 10.

Figure 5:
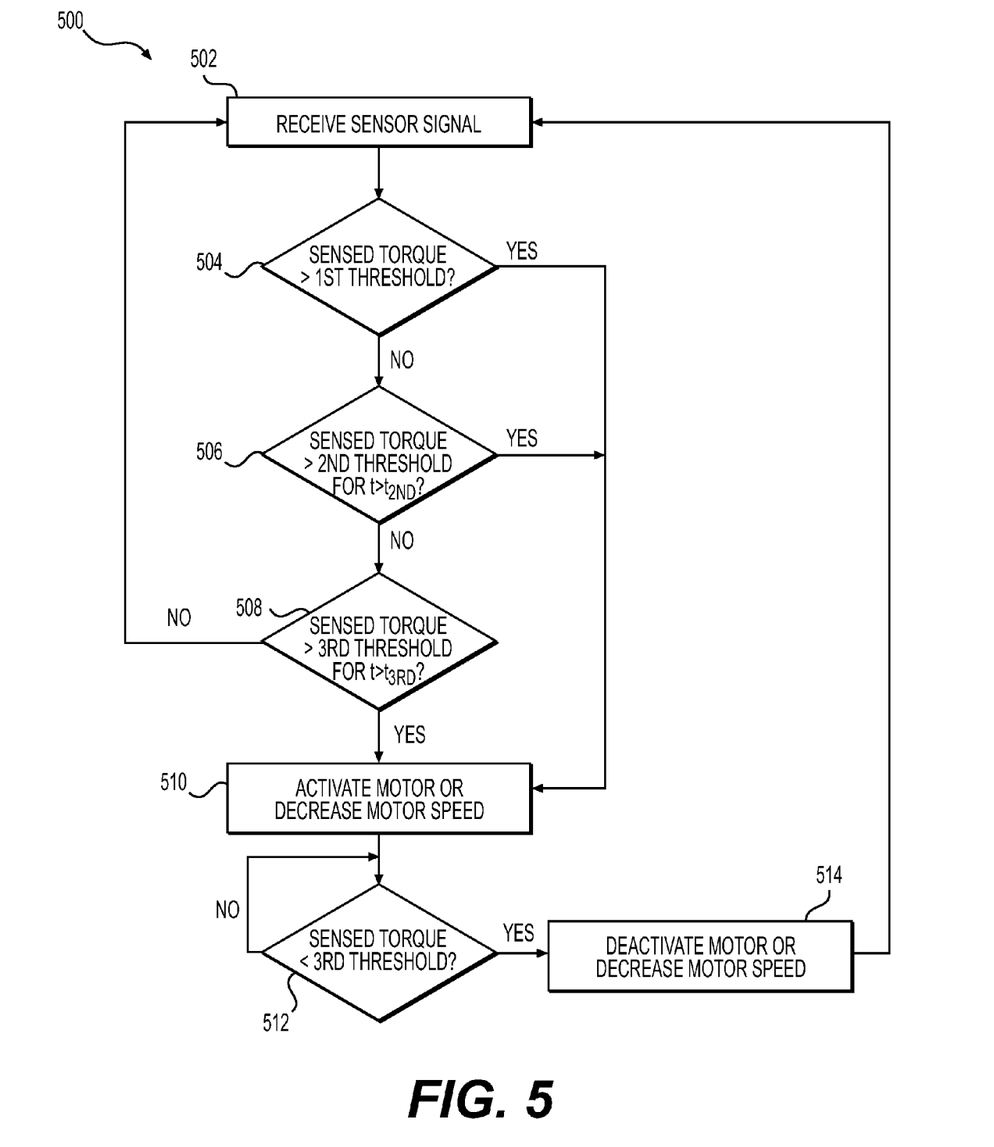
FIG. 5 is a flow chart illustrating a method according to another exemplary embodiment of the present disclosure.

FIG. 5 depicts a flowchart of an exemplary control method executed by control unit 50. A method 500 may start at step 502 that is substantially similar to step 302 described with reference to FIG. 3. That is, while bus 10 is in a driving mode, control unit 50 may continuously receive sensor signals from torque sensor 52 representative of the torque applied to motor 38. Method 500 may then proceed to step 504, where control unit 50 may compare the sensed torque to a first torque threshold. The first torque threshold may correspond to a relatively high torque being applied by electric motor 38, indicating that hydraulic assistance may be immediately desired or required to steer bus 10, e.g., when a driver is sharply turning bus 10 at low speeds or when bus 10 is turning from a complete stop.

If the sensed torque at electric motor 38 is below the first torque threshold, the method may proceed to step 506 where control unit 50 may determine whether the sensed torque threshold is above a second torque threshold for a time period that is greater than a second torque threshold amount of time $t_{2nd}$. The time period $t_{2nd}$ may be about 0.3 seconds or another suitable time period. The second torque threshold may be lower than the first torque threshold. If the control unit 50 determines that the sensed torque has remained above the second torque threshold for a length of time greater than $t_{2nd}$, the method 500 may proceed to step 510, where electric motor 38 may be activated to provide hydraulic steering assistance. This combination of torque threshold and time criteria at, e.g., step 506 of method 500, may indicate that normal steering maneuvers, e.g., a left or right hand turn at an intersection or traversing a roundabout at low speeds, are being performed by a driver of bus 10.

If the sensed torque at electric motor 38 does not remain above the second torque threshold for a length of time greater than $t_{2nd}$, the method 500 may proceed to step 508. At step 508, control unit 50 may determine whether the sensed torque is above a third torque threshold for a time period that is greater than a third torque threshold time amount of time $t_{3rd}$. The time period $t_{3rd}$ may be about 1.0 seconds, or another suitable period of time. The third torque threshold may be lower than the second torque threshold, and the third torque threshold amount of time $t_{3rd}$ may be longer than the second torque threshold amount of time $t_{2nd}$. If control unit 50 determines that the sensed torque has remained above the relatively low third torque threshold for a period of time longer than $t_{3rd}$, the method may proceed to step 510. This combination of torque threshold and time criteria at e.g., step 508 of method 500, may indicate that a driver of bus 10 is performing steering maneuvers requiring minimal or delayed hydraulic assistance, such as, e.g., negotiating a long, sweeping turn. If the control unit 50 does not sense that the sensed torque has remained above the third torque threshold for greater than time $t_{3rd}$, the method may return to step 502.

In one example, the third torque threshold may be from 0.1 newton meters to 20 newton meters, although any other suitable torque value (or value indicative of torque) is also contemplated. The second torque threshold may be, e.g., 15 to 35 percent higher than the third torque threshold, while the first torque threshold may be, e.g., 10 to 30 percent higher than the second torque threshold. The first threshold may be, e.g., 20 to 75 percent higher than the third torque threshold.

At step 510, control unit 50 may send a signal to activate or increase the speed of electric motor 38 so as to provide hydraulic steering assistance. In the hydraulic assistance mode, the electric motor 38 may cause pump 36 to cycle hydraulic fluid through the hydraulic system 46, generating a hydraulic pressure that can be used to help turn wheels 24. In one embodiment, electric motor 38 may be maintained at the same speed once activated or transitioned into the hydraulic assistance mode regardless of the torque threshold that triggered activation or transition of the electric motor 38 into the hydraulic assistance mode. That is, regardless of whether electric motor 38 was activated or transitioned based on parameters being met at step 504, step 506, or step 508, electric motor 38 may be maintained at the same operating speed. This single operating speed may be sufficiently high to satisfy any possible hydraulic assistance need contemplated for steering bus 10.

In another embodiment, control unit 50 may maintain the rotation speed of electric motor 38 (and thus the speed of fluid through pump 36 and hydraulic system 46) based on the level of torque sensed by one or more of torque sensor 52, current sensor 53, pressure sensor 54, and torque sensor 56. That is, as the level of torque indicated by the one or more sensors increases, control unit 50 may increase the speed of electric motor 38. In one embodiment, control unit 50 may maintain electric motor 38 at a first operating speed when the sensed torque is above the first torque threshold. The control unit 50 may maintain electric motor 38 at a second operating speed when the sensed torque is above the second torque threshold for a length of time greater than $t_{2nd}$, but when the sensed torque is below the first torque threshold. The first operating speed may be higher than the second operating speed. The control unit 50 may also maintain electric motor 38 at a third operating speed that is lower than the second operating speed when the sensed torque is greater than the third torque threshold for a length of time greater than $t_{3rd}$, but when the sensed torque is below the first and second torque thresholds.

Once electric motor 38 is activated or transitioned to the hydraulic assistance mode, the method 500 may proceed to step 512, where control unit 50 determines whether electric motor 38 should be powered down completely, or throttled down to a lower operational speed. For example, in one embodiment, control unit 50 may compare the torque sensed by the one or more sensors to the lowest torque threshold (e.g., the third torque threshold) regardless of which torque threshold triggered activation of the electric motor 38 or transition of electric motor 38 to the hydraulic assistance mode. This may allow for continued hydraulic steering assistance even when the sensed torque has fallen below the triggering torque threshold, but remains above other torque thresholds that require hydraulic steering assistance. If the sensed torque remains above the third torque threshold, control unit 50 may determine that power steering assistance is still needed to turn bus 10, and may maintain electric motor 38 in a running, "ON," or hydraulic assistance state. If the sensed torque falls below the third torque threshold, control unit 50 may determine that power steering assistance is no longer required, and may power down or throttle the speed of electric motor 38 at step 514. In some embodiments, while electric motor 38 is in the hydraulic assistance mode, control unit 50 may require that the sensed torque remain below the third torque threshold for a threshold amount of time before powering down or throttling down the electric motor 38 to ensure that power steering is no longer required to turn bus 10 in a substantially similar manner as described with reference to step 308.

In embodiments where the operating speed of electric motor 38 is variable based upon which torque threshold triggered activation of electric motor 38, control unit 50 may be configured to throttle the operating speed of electric motor 38 at step 512 to correspond to any torque thresholds (e.g., the second or third torque threshold described above) that are still satisfied. For example, control unit 50 may throttle electric motor 38 from the first operating speed to the second operating speed, from the first operating speed to the third operating speed, or from the second operating speed to the third operating speed.

Figure 6:
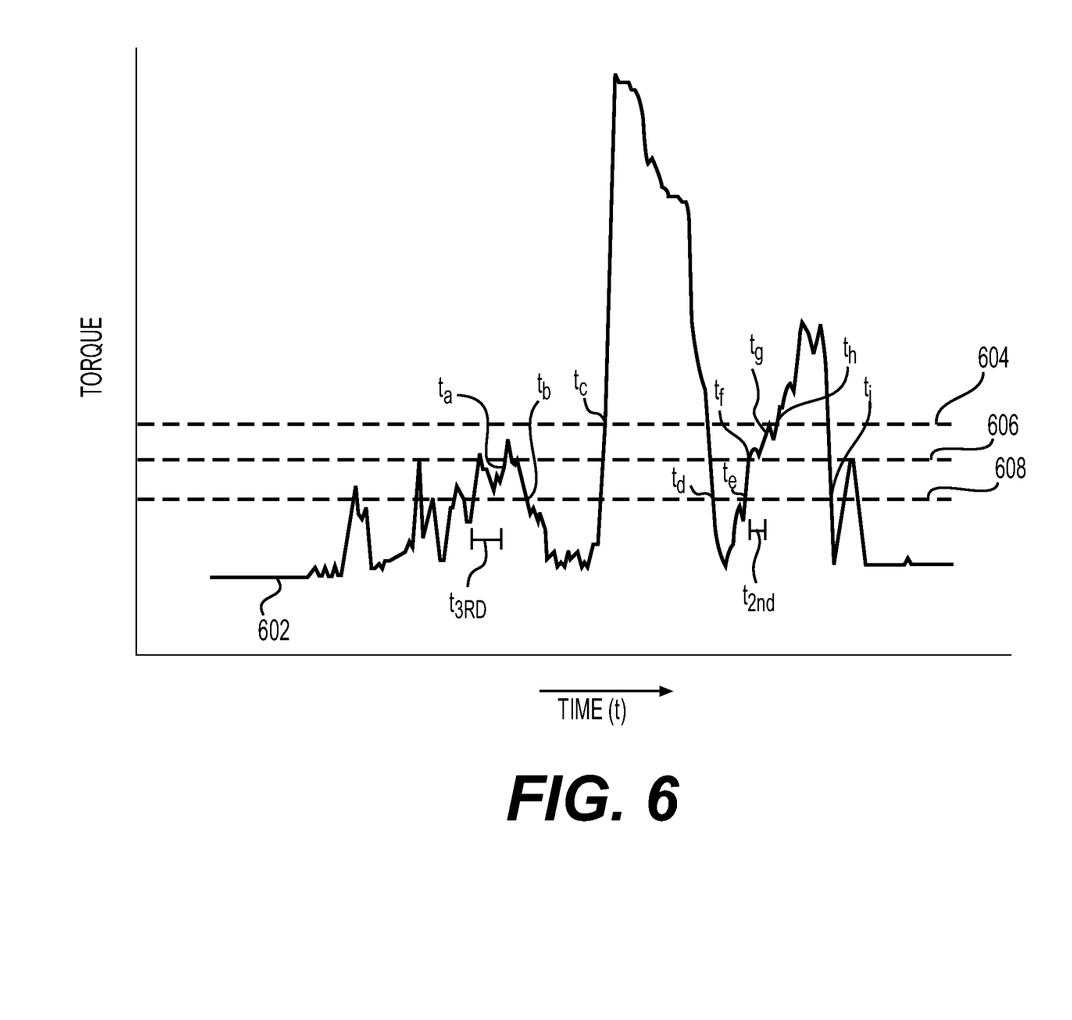
FIG. 6 is a graphical illustration of an implementation of the method of FIG. 5.

FIG. 6 is a graphical illustration of an implementation of method 500 over time t. The torque measured by sensor 52 is shown as a torque curve 602. Prior to a time $t_a$, the measured torque may not have satisfied any of the torque assistance criteria set forth by, e.g., steps 504, 506, and 508, of method 500. Torque sensor 52 may have sensed minor torque events (e.g., slight adjustments made by a driver to steering wheel 26) that momentarily exceeded the second torque threshold 606 or the third torque threshold 608. However, at time $t_a$, the sensed torque is shown to have exceeded the third torque threshold 608 for a length of time greater than $t_{3rd}$. At time $t_a$, control unit 50 may send a signal to transition electric motor 38 into the hydraulic assistance mode. At time $t_b$, the sensed torque may fall below the third torque threshold. Control unit 50 may instantaneously power down or throttle the speed of electric motor 38 at $t_b$, or may require that the sensed torque remain below the third threshold 608 for a predetermined delay period to help ensure that hydraulic steering assistance is no longer required by the driver.

At time $t_c$, the sensed torque may exceed the first (and highest) torque threshold 604, at which point control unit 50 may instantaneously (or near-instantaneously) send a signal to operate electric motor 38 in the hydraulic assistance mode. Control unit 50 may maintain electric motor 38 in an ON or running condition at least until a time $t_d$ when the sensed torque falls below the third torque threshold 608.

At time $t_e$, the sensed torque may exceed the third torque threshold 604, and at a later time $t_f$ may exceed the second torque threshold 606. At time $t_f$ no hydraulic assistance criteria have yet been satisfied so as to cause control unit 50 to activate or transition electric motor 38 into the hydraulic assistance mode. However, at time $t_g$, the sensed torque may have exceeded the second torque threshold 606 for a period of time greater than $t_{2nd}$ (e.g., the time difference between $t_g$ and $t_f$). At $t_g$, control unit 50 may send a signal to activate electric motor 38. While electric motor 38 is in the hydraulic assistance mode, the sensed torque may exceed the first torque threshold 604 at time $t_h$. In embodiments where electric motor 38 is maintained at a single operational speed regardless of which torque threshold criteria caused activation or transition of electric motor 38, nothing may occur at time $t_h$, as electric motor 38 may already be operating at a speed sufficient to satisfy the hydraulic assistance needs above the first torque threshold 604. However, in embodiments where control unit 50 is configured to maintain electric motor 38 at various operational speeds (e.g., a first, second, and third operational speed) based on the triggering torque threshold, control unit 50 may throttle the speed of electric motor 38 up at time $t_h$. Control unit 50 may then power down or throttle down the speed of electric motor 38 at time $t_i$, when the sensed torque falls below the third torque threshold 604.

The control methods disclosed herein may improve energy efficiency of hydraulic power steering systems and reduce component wear, as the associated electric motors and pumps may be activated only when needed. Energy efficiency of the hydraulic steering systems may be particularly important for buses and vehicles that operate only by electric power, as extending the battery life of these vehicles may increase their range and usability.

In some embodiments described herein, only the torque applied to the electric motor 38 may be measured. This torque may be the result of a feedback from the hydraulic system 46 that fluid is being used for steering wheels 24. In these embodiments, the measurement from torque sensor 52 may be used to control the speed of the electric motor 38, thus decoupling it from the driver's application of torque. That is, the torque measured at the steering wheel 26 are attributed to driver applied torque and hydraulic assist torque. Thus, controlling steering based on a torque measurement at the steering wheel 26 alone may increase complexity, as the control unit 50 may need to account for the portion of the measured torque caused by the hydraulic assist.

While principles of the present disclosure are described with reference to an electric bus, it should be understood that the disclosure is not limited thereto. Rather, the systems and methods described herein may be employed in any electric vehicle (car, two wheeler, train, etc.). Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A steering system for an electric vehicle, comprising:
   a hydraulic pump configured to direct hydraulic fluid to a steering gearbox of the electric vehicle;
   an electric motor having a shaft that is coupled to the hydraulic pump, the electric motor configured to drive fluid flow through the pump;
   a sensor configured to measure a value indicative of a torque applied by the electric motor; and
   a control unit configured to control operation of the electric motor based on an input from the sensor, wherein the control unit is configured to:
      increase a speed of the electric motor when a torque indicated by the sensor is greater than a first torque threshold;
      increase the speed of the electric motor when a torque indicated by the sensor is greater than a second torque threshold for a first threshold amount of time, wherein the second torque threshold is lower than the first torque threshold; and
      increase the speed of the electric motor when a torque indicated by the sensor is greater than a third torque threshold for a second threshold amount of time, wherein the third torque threshold is lower than the second torque threshold, wherein the second threshold amount of time is longer than the first threshold amount of time.

2. The steering system of claim 1, wherein the control unit is configured to increase the speed of the electric motor instantaneously when the torque indicated by the sensor is greater than the first torque threshold.

3. The steering system of claim 2, wherein the first threshold amount of time is greater than an instantaneous amount of time.

4. The steering system of claim 1, wherein the control unit is configured to maintain the electric motor at a first operating speed when the indicated torque is at any torque above the first torque threshold, and wherein the control unit is configured to maintain the electric motor at a second operating speed when the indicated torque is at any torque above the second torque threshold but below the first torque threshold.

5. The steering system of claim 4, wherein the first operating speed is higher than the second operating speed.

6. The steering system of claim 5, wherein when the electric motor is operating at the first operating speed and the indicated torque subsequently falls below the first torque threshold but remains above the second torque threshold, the control unit is configured to throttle the speed of the electric motor down from the first operating speed to the second operating speed.

7. The steering system of claim 1, wherein the sensor is a torque sensor coupled to the electric motor and is configured to measure a torque applied by the shaft of the electric motor.

8. The steering system of claim 1, wherein the sensor is a current sensor configured to measure a current directed to the electric motor, wherein the measured current is indicative of a torque applied by the electric motor.

9. A method for controlling power steering in an electric vehicle, the method comprising:
  receiving a measurement indicative of a torque applied by an electric motor of the electric vehicle, the electric motor driving a hydraulic pump supplying hydraulic steering assist pressure to a steering gearbox of the electric vehicle;
  activating the electric motor to generate hydraulic steering assist pressure with the hydraulic pump when the indicated torque is greater than a first torque threshold, a second torque threshold, or a third torque threshold, wherein the second torque threshold is lower than the first torque threshold, and the third torque threshold is lower than the second torque threshold;
  maintaining the electric motor at a first speed at all sensed torque levels above the first torque threshold;
  maintaining the electric motor at a second speed at all torque levels between the first torque threshold and the second torque threshold, wherein the second speed is lower than the first speed;
  activating the electric motor when the indicated torque is below the first torque threshold but greater than the second torque threshold for a first threshold amount of time; and
  activating the electric motor when the indicated torque is below the second torque threshold but greater than the third torque threshold for a second threshold amount of time, wherein the second threshold amount of time is larger than the first threshold amount of time.

10. The method of claim 9, further including activating the electric motor instantaneously when the indicated torque is greater than the first torque threshold value.

11. An electric vehicle, comprising:
  a steering wheel;
  a pair of wheels coupled to one another by one or more steering linkages;
  a steering gearbox coupled to the steering wheel and to the pair of wheels, the steering gearbox configured to turn the pair of wheels in response to a torque applied to the steering wheel;
  a hydraulic pump configured to direct hydraulic fluid to the steering gearbox to assist turning of the pair of wheels;
  an electric motor having a shaft that is coupled to the hydraulic pump, the electric motor configured to drive fluid flow through the hydraulic pump;
  a current sensor configured to measure a current directed to the electric motor, wherein the measured current is indicative of a torque applied by the electric motor; and
  a control unit configured to:
    increase a speed of the electric motor when the torque indicated by the current sensor is greater than a first torque threshold, a second torque threshold that is lower than the first torque threshold, or a third torque threshold that is lower than the second torque threshold;
    maintain the electric motor at a first speed at all torque levels between the first and second torque thresholds; and
    maintain the electric motor at a second speed at all torque levels between the second and third torque thresholds, wherein the first speed is greater than the second speed.

12. The electric vehicle of claim 11, further including one or more batteries configured to drive the electric motor, wherein the one or more batteries are also configured to drive a powertrain of the electric vehicle.

13. The electric vehicle of claim 11, wherein the control unit is configured to activate the electric motor instantaneously when the torque indicated by the current sensor is greater than the first torque threshold.

14. The electric vehicle of claim 11, wherein the control unit is configured to maintain the speed of the electric motor at a third speed at all torque levels above the first torque threshold, wherein the third speed is greater than the first speed.

15. The electric vehicle of claim 14, wherein the control unit is configured to:
  instantaneously direct the electric motor to operate at the third speed when the torque indicated by the current sensor is greater than the first torque threshold;
  direct the electric motor to operate at the first speed when the torque indicated by the current sensor is greater than the second torque threshold but below the first torque threshold for a first threshold amount of time, the first threshold amount of time being greater than an instantaneous amount of time;
  direct the electric motor to operate at the second speed when the torque indicated by the current sensor is greater than the third torque threshold but below the second torque threshold for a second threshold amount of time, wherein the second threshold amount of time is greater than the first threshold amount of time.

* * * * *